United States Patent [19]
Bunnell

[11] Patent Number: 5,186,919
[45] Date of Patent: Feb. 16, 1993

[54] METHOD FOR PRODUCING THIN GRAPHITE FLAKES WITH LARGE ASPECT RATIOS

[75] Inventor: L. Roy Bunnell, Kennewick, Wash.

[73] Assignee: Battelle Memorial Institute, Richland, Wash.

[21] Appl. No.: 791,864

[22] Filed: Nov. 12, 1991

Related U.S. Application Data

[60] Continuation-in-part of Ser. No. 599,670, Oct. 18, 1990, Pat. No. 5,065,948, which is a division of Ser. No. 275,071, Nov. 21, 1988, Pat. No. 4,987,175.

[51] Int. Cl.$^5$ ............................................. C01B 31/04
[52] U.S. Cl. .................................................... 423/448
[58] Field of Search ....................................... 423/448

[56] References Cited

U.S. PATENT DOCUMENTS

| | | | |
|---|---|---|---|
| 3,409,563 | 11/1968 | Olstowski | 423/448 |
| 3,560,155 | 2/1971 | Olstowski et al. | 423/448 |
| 4,091,083 | 5/1978 | Hirschuogel et al. | 423/415 R |
| 4,888,242 | 12/1989 | Matsuo et al. | 423/448 |
| 4,895,713 | 1/1990 | Greinke et al. | 423/448 |
| 4,961,988 | 10/1990 | Zhu | 423/448 |

Primary Examiner—Wayne Langel
Attorney, Agent, or Firm—Paul W. Zimmerman

[57] ABSTRACT

A method for making graphite flakes of high aspect ratio by the steps of providing a strong concentrated acid and heating the graphite in the presence of the acid for a time and at a temperature effective to intercalate the acid in the graphite; heating the intercalated graphite at a rate and to a temperature effective to exfoliate the graphite in discrete layers; subjecting the graphite layers to ultrasonic energy, mechanical shear forces, or freezing in an amount effective to separate the layes into discrete flakes.

8 Claims, 3 Drawing Sheets

100 μm

50 μm

100 μm

METHOD FOR PRODUCING THIN GRAPHITE FLAKES WITH LARGE ASPECT RATIOS

This application is a continuation-in-part of U.S. patent application Ser. No. 07/519,670, filed Oct. 18, 1990, which is now U.S. Pat. No. 5,065,948; which is a Divisional Application of U.S. patent application Ser. No. 275,071, filed Nov. 21, 1988, which is now U.S. Pat. No. 4,987,175.

TECHNICAL FIELD

This invention relates generally to a method for making thin flakes that have utility in polymer reinforcement. The method expeditiously uses ultrasonic waves or shear forces from a simple blender to break graphite exfoliated by acid intercalation into thin flakes that provide superior properties when used as a polymer reinforcement.

BACKGROUND OF THE INVENTION

At present, there are hundreds of polymers that are used in a wide variety of products. These polymer materials differ in their molecular composition and construction, and consequently in their physical properties such as melting point, strength, stiffness, etc. The molecular level differences produce differences in the way in which these materials must be processed in order to produce useful finished products. Generally higher performance polymers capable of exposure to extreme environments are expensive and relatively difficult to shape.

Polymers can be used in their relatively pure form in producing useful articles, or also as the matrix phase in composite materials. Such composite materials typically comprise a matrix phase and a reinforcement phase. With most composites, it is desired that the finished material possess structural and other mechanical properties typical of metal.

To achieve the desired structural properties, the reinforcement phase is typically maximized and is comprised of a fibrous reinforcing material. The orientation of the reinforcement fibers is usually controlled to produce the highest strength and stiffness of the finished material in the desired direction or directions. Various filler materials can also be added to pure polymers or polymer composites to increate durability, or simply to decrease the amount of the relatively more expensive polymer which is used. These fillers are usually roughly spherical in shape, and do not function well as reinforcements because the spherical shape does not allow much load transfer by shear.

Graphite fiber is one material that has been added to polymers for reinforcement. Examples of finished products incorporating polymers and graphite fibers are golf club shafts, fishing rods, etc. The graphite material in such products is typically comprised of long fibers which are woven and specifically oriented within the material to maximize strength of flexibility in a given direction.

The primary intent of this invention was to create stronger polymer composite materials at reduced cost. Other advantages may be achievable by practice of the various aspects of the invention as will be appreciated by the artisan.

BRIEF DESCRIPTION OF THE INVENTION

The present invention provides a method for making graphite flakes of high aspect ratio by the steps of providing a strong concentrated acid and heating the graphite in the presence of the acid for a time and at a temperature effective to intercalate the acid in the graphite; heating the intercalated graphite at a rate and to a temperature effective to exfoliate the graphite in discrete layers; subjecting the graphite layers to ultrasonic energy or mechanical shear forces in an amount effective to separate the layers into discrete flakes. Preferably a mixture of concentrated nitric acid and sulfuric acid is used. The mechanical shear forces can expeditiously be provided by a blender such as for example by a food processor.

Figure 1:
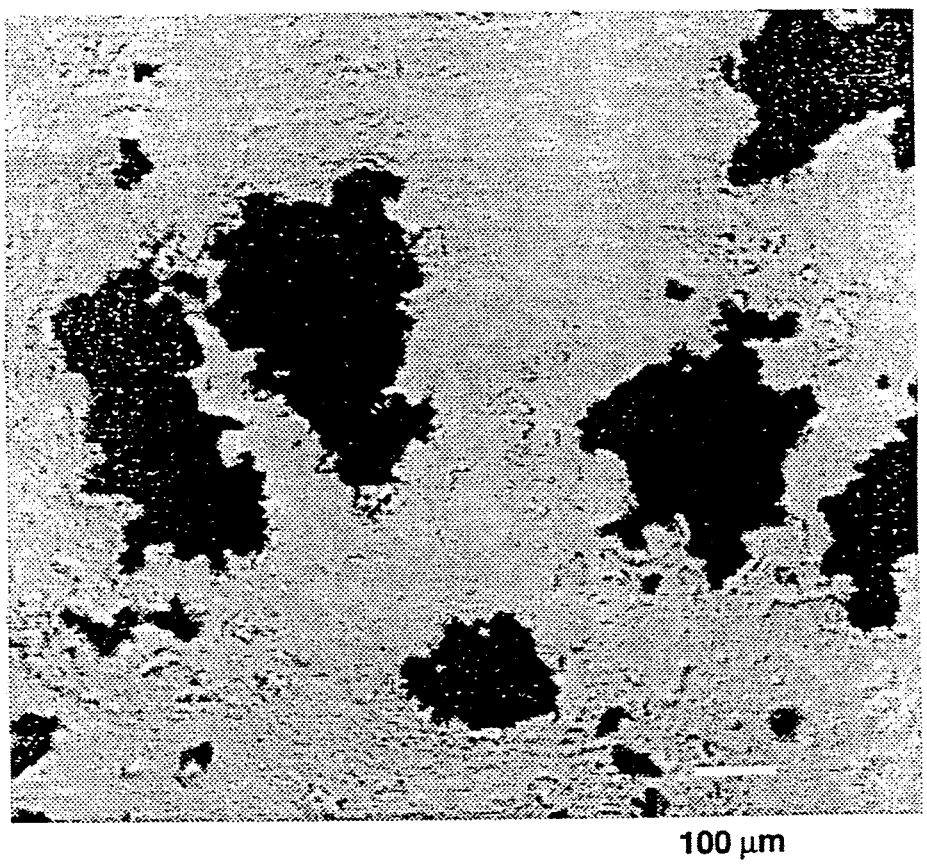
FIG. 1 is a photograph of flakes produced by ultrasonic agitation.

DETAILED DESCRIPTION OF PREFERRED EMBODIMENTS AND BEST MODES FOR CARRYING OUT THE INVENTION

Compositions in accordance with the invention comprise a polymer and a flake reinforcing material distributed therethrough in an effective amount to structurally reinforce the polymer. Individual flakes of the flake material a) are less than or equal to 1,000 Angstroms in thickness, b) have an aspect ratio (largest dimension/smallest dimension) greater than or equal to 100, and c) preferably are significantly randomly oriented throughout the polymer as opposed to being deliberately aligned or configured in some organized manner. It is anticipated that any of a wide variety or platy solid materials that can be ground into thin flakes can function as the flake reinforcing material. Examples of such materials include graphite, mica and talc flakes. Further examples or workable materials might include glass flakes, certain platy clays such as kaolinite, and certain platy metal ores such as $MoS_2$ and $ZnS$. Actual reduction to practice at this writing has been demonstrated with graphite flakes.

The effective amount of flake reinforcing material in the composition is preferably anywhere from 5 to 50 volume percent, with volume percents in the lower portion of this range being most preferred. The thickness of individual flakes will typically fall between 100 and 1,000 Angstroms, with a flake thickness of less than or equal to 500 Angstroms being preferred. Graphite flake is the preferred reinforcing flake material additive in terms of its strength, stiffness, low density and low cost. It is anticipated that with a 10 volume percent inclusion of graphite flakes in inexpensive polymers, such as polyethylene or polypropylene, the stiffness of the finished product will approach that of aluminum. Although graphite flakes are very strong along two directions, they are very weak and subject to shear in a third. Accordingly, the flakes should be as thin as possible to preclude development of large shear forces across them in use.

Similarly, the flakes should typically not be deliberately aligned in the polymer, but rather should be significantly randomized to avoid weakness in the finished product in any one direction. As "randomness" is a matter of degree, the terminology "significantly random" is used. This terminology is intended to imply any degree of flake randomness having a desired effect of contributing to strength and isotropy in the finished material. If anisotropy in the finished material were desired, the flakes could be suitably oriented to produce the desired properties in the desired directions in the finished composite.

Thin graphite flakes less than 1,000 Angstroms in thickness and having an aspect ratio in excess of 100 could be produced by a number of different methods. For example, the anisotropy in the strength of a graphite crystal makes it relatively easy to grind into thin flakes by ball-milling techniques. For greatest efficiency, a simple and relatively volatile hydrocarbon, such as octane, is preferably used during milling. The purpose of the hydrocarbon is to cover newly exposed surfaces that result from the shearing to prevent possible recombination of individual flakes, natural graphite has been ball milled into flakes 400 Angstroms thick and 7 microns in the remaining two dimensions, which provides an aspect ratio of approximately 175. Other methods, such as ultrasonic vibration or by an exfoliation/intercalation process might also be usable in producing thin high aspect ratio flakes for use in accordance with the invention. An invention method and apparatus for producing such thin flakes will be described below.

Structural reinforcement of polymers by graphite flake addition has been demonstrated. Two identical size cantilever beams were fabricated from DER 332 epoxy resin, manufactured by Dow Chemical. One beam consisted essentially of the pure epoxy, while the other contained approximately 10 to 11 volume percent of randomly distributed graphite flakes that had been ball-milled to approximately 450 Angstroms thick, and having an aspect ratio of approximately 170. When the two cantilever teams were mechanically loaded with weights, there was a dramatic difference in the deflections. Using the measured deflections, it was calculated that the graphite flake reinforced beam was 42 times as stiff as the non-reinforced beam.

In parent U.S. Pat. No. 4,987,175, the disclosure of which is incorporated herein by reference, the methods for producing thin flakes by grinding (ball-milling do produce very thin flakes of high aspect ratio, but the flakes are small in their target dimensions (only about $10\mu$). Standard texts on short-fiber reinforcement usually include the concept of minimum fiber length necessary for efficient reinforcements. See for example the text by L. Holliday, Editor; *Composite Materials;* Glass Systems, Properties of Glass-Resin Composites; pp. 176-177, Elsevier, 1966. The minimum length is about 1-2 mm; therefore, ball-milled flakes are only about 1 percent as long as they should be, assuming that flakes and rods are similar.

In the experiment disclosed in U.S. Pat. No. 4,987,175, a very soft epoxy was stiffened by a factor of 42 by adding 11 percent ground graphite flake. This is an impressive increase, but the final Young's modulus was still only 290,000 psi. A rule-of-mixtures calculation indicates the modulus should have been about $11 \times 10^6$ psi, assuming graphite flake has a Young's modulus of $100 \times 10^6$ psi. Obviously the efficiency of reinforcement was very poor and could be improved greatly.

Example A

Graphite, obtained as a sample from Asbury Graphite and labelled #3222, expands by a factor >100 when intercalated with a strong acid such as concentrated nitric and sulfuric acid and heated quickly to about 600° C. While not wishing to be bound by any particular theory, it appears that the mechanism is similar to popcorn. The acids ($HNO_3 + H_2SO_4$) are trapped between layer planes of the highly oriented natural flake graphite, and decompose when heated, exfoliating or pushing the layers apart.

The exfoliated graphite was added to hexane containing a small amount (2-3% by weight) of fish oil as a surfactant then subjected to an ultrasonic energy of about 345 watt for five minutes. Some of the graphite flakes separated from the exfoliated mass, but much of the mass remained intact at the bottom of the beaker. The separated flakes were photographed (FIG. 1) and measured and found to have the following characteristics;

| Thickness | $t \geq 1000$ Angstroms |
|---|---|
| Mean diameter | 89 Microns |
| Minimum diameter | 3 Microns |
| Maximum diameter | 320 Microns |
| Standard deviation | 88 Microns |
| Sample size | 60 Flakes |

These characteristics result in an average aspect ratio (diameter divided by thickness) of about 890.

It is postulated that the application of higher energy ultrasound that introduces higher shear forces in an amount effective to separate the flakes may produce flakes of greater aspect ratio. The ultrasonic energy level should be above 345 watt. Frequencies between about 10,000 and 50,000 Hz are contemplated.

Example B

Figure 2:
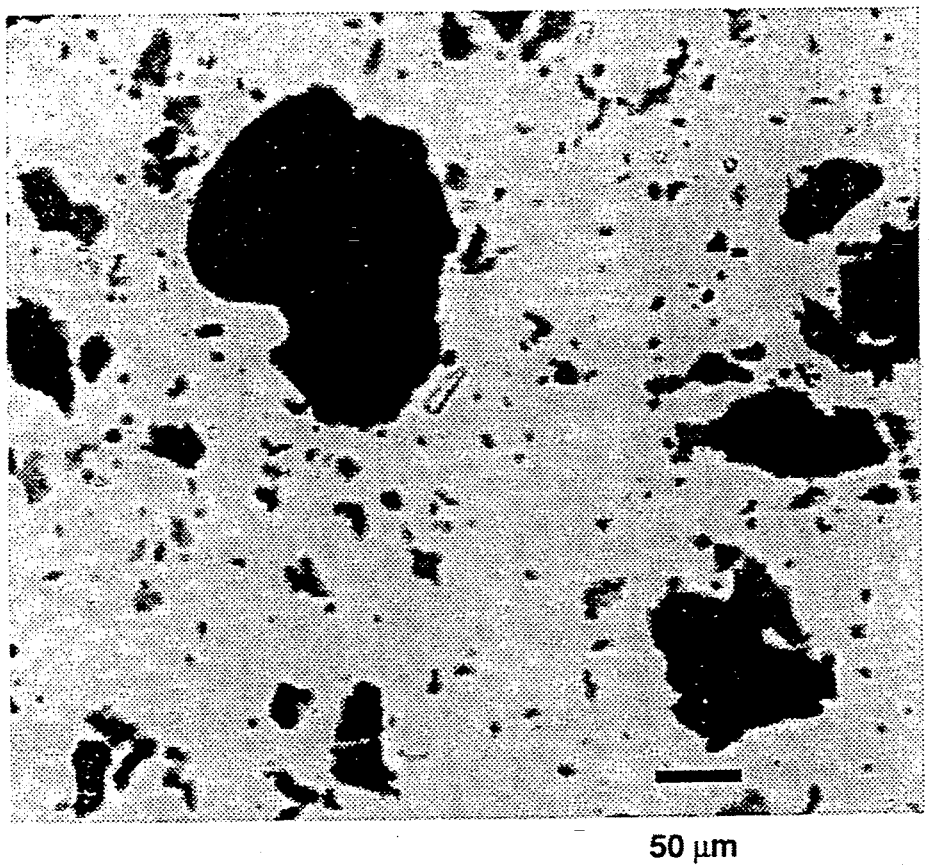
FIG. 2 is a photograph of flakes produced in a blender.

Graphite exfoliated by the procedure of Example A, was separated in a blender, i.e. food processor. The exfoliated graphite was placed in water containing a surfactant (dishwashing detergent) and the mixture subjected to shear forces in a blender. The water was removed by evaporation and graphite flakes recovered. The separated flakes were photographed (FIG. 2) and measured and found to have the following characteristics;

| Thickness | $t \geq 1000$ Anngstroms |
|---|---|
| Mean diameter | 16 Microns |
| Minimum diameter | 1 Micron |
| Maximum diameter | 172 Microns |
| Standard deviation | 23 Microns |
| Sample size | 232 Flakes |

From these characteristics, the average aspect ratio is about 160.

Example C

Figure 3:
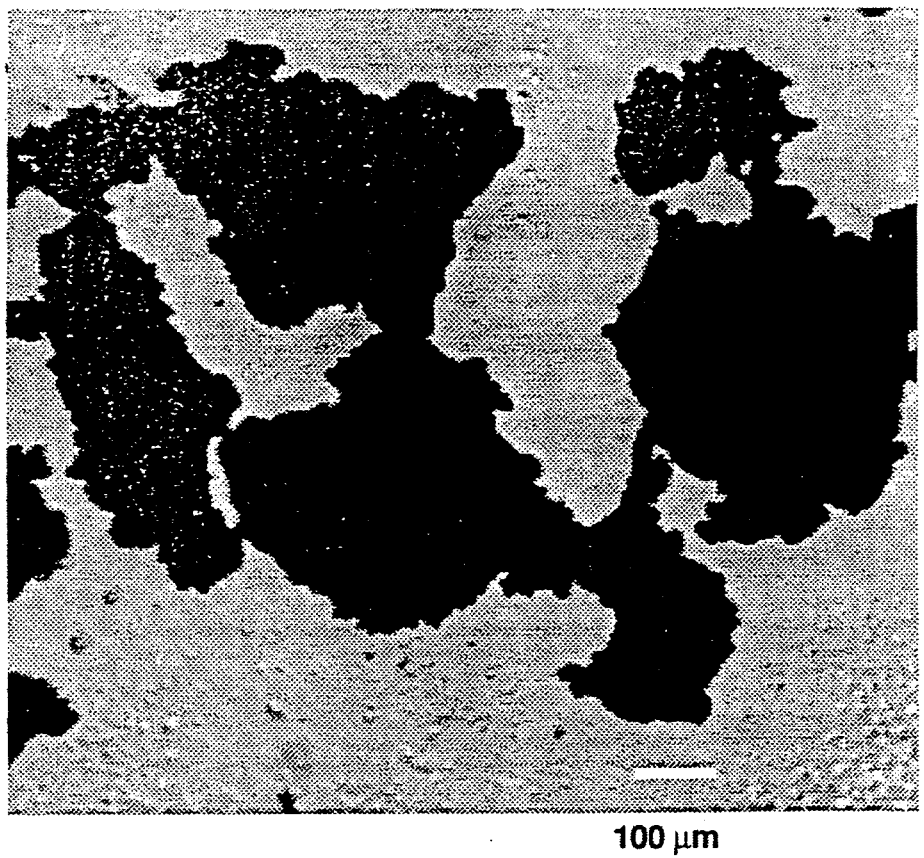
FIG. 3 is a photograph of flakes produced by shear mixing.

Graphite exfoliated by the procedure of Example A, added to hexane containing a small amount (about 2-3% by weight) of fish oil as a surfactant then mixed in a high-speed shear mixer (Brinkmann Polytron PT-6000) operated at about ½ speed for five minutes. The separated flakes were photographed (FIG. 3) and measured and found to have the following characteristics;

| Thickness | t ≧ 1000 Anngstroms |
|---|---|
| Mean diameter | 142 Microns |
| Minimum diameter | 3 Micron |
| Maximum diameter | 607 Microns |
| Standard deviation | 142 Microns |
| Sample size | 28 Flakes |

From these characteristics, the average aspect ratio is about 1420.

It is known that then graphite is intercalated (50/50 mix of concentrated $HNO_3$+conc. $H_2SO_4$) low boil for 1 hour, the exfoliated graphite has a rather high surface area $-20$ to $30 \, m^2/g$. This enables a rough calculation of how thick the individual layers are. The calculation is as follows: Assume that the individual layers are disk-shaped flakes of graphite having diameter (2r), thickness t, surface area $30 \, m^2/g$, and graphite density (theoretical) of 2.26 g/cc.

$$\frac{A}{m} = 30 \frac{m^2}{g} = \frac{2\pi r(r+t)}{\rho \pi r^2 t} = \frac{2(r+t)}{\rho r t} = \frac{2r}{\rho r t} = \frac{2t}{\rho r t} =$$

$$\frac{2}{\rho t} + \left(30 - \frac{2}{\rho t}\right) = \frac{2}{\rho t}, \text{ so } t = \frac{2}{\rho \left(30 - \frac{2}{\rho r}\right)}$$

$$t = \frac{2}{2.26 \frac{g}{cm^3} \left[30 \times 10^4 \frac{cm^2}{g} - \frac{2}{2.26 \frac{g}{cm^3}} \cdot 0.05 \, cm\right]} =$$

$$2.95 \times 10^{-6} \, cm = 2.95 \times 10^{-8} \, m \times \frac{10^{10} \text{Å}}{m} = 295 \text{Å}$$

$A$ = surface area = $2\pi r^2 + 2\pi r t$
$V$ = volume = $\pi r^2 t$
$m$ = mass = $\rho V = \rho \pi r^2 t$ With an a-b dimension of 1 millimeter such a flake would have an aspect ratio of $$\frac{10^7 \text{Å}}{295 \text{Å}} \approx 34,000,$$

an extremely high value. Using the methods disclosed herein, this high value will allow the achievement of extremely efficient material reinforcement and resultant improved material properties.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. A method for making thin graphite flakes, comprising:
   (a) intercalating a strong concentrated acid into a graphite mass,
   (b) exfoliating the intercalated graphite mass, and
   (c) separating the exfoliated graphite mass into discrete flakes.

2. A method as recited in claim 1, wherein intercalating comprises:
   (a) placing the graphite mass into a strong concentrated acid, and
   (b) heating the graphite mass/strong concentrated acid mixture for a time and at a temperature sufficient to absorb acid between layers of the graphite mass.

3. The method as recited in claim 2 wherein the strong concentrated acid is a mixture of concentrated nitric acid and concentrated sulfuric acid.

4. The method as recited in claim 2, wherein exfoliating comprises:
   quickly heating the intercalated graphite mass to a temperature of about 600° C. whereby the strong acid expands the graphite mass.

5. The method as recited in claim 4, wherein separating the exfoliated graphite mass into flakes, comprises:
   (a) placing the exfoliated graphite into a mixture of hexane and fish oil, and
   (b) subjecting the mixture to ultrasonic energy above 345 watt.

6. The method as recited in claim 4, wherein separating the exfoliated graphite mass into flakes, comprises:
   (a) placing the exfoliated graphite mass into a mixture of water and surfactant in a blender, and
   (b) subjecting the mixture to the mechanical shear forces provided by the blender.

7. The method as recited in claim 4, wherein separating the exfoliated graphite mass into flakes, comprises:
   (a) placing the exfoliated graphite mass into a mixture of hexane and fish oil in a shear mixer, and
   (b) subjecting the mixture to the mechanical shear forces provided by the shear mixer.

8. A method for making thin graphite flakes, comprising:
   (a) placing a graphite mass into an acid mixture of concentrated nitric acid and concentrated sulfuric acid,
   (b) heating the graphite mass/acid mixture for a time and at a temperature sufficient to absorb acid between layers of the graphite mass,
   (c) exfoliating the intercalated graphite mass, and
   (d) separating the exfoliated graphite mass into discrete flakes.

* * * * *